United States Patent
Chen

(10) Patent No.: US 11,600,843 B2
(45) Date of Patent: Mar. 7, 2023

(54) METHOD FOR MANUFACTURING SPIRAL-WOUND BATTERY

(71) Applicant: ASUSTEK COMPUTER INC., Taipei (TW)

(72) Inventor: Yu-Kuang Chen, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 554 days.

(21) Appl. No.: 16/364,895

(22) Filed: Mar. 26, 2019

(65) Prior Publication Data
US 2019/0296386 A1 Sep. 26, 2019

(30) Foreign Application Priority Data
Mar. 26, 2018 (CN) .......................... 201810251344.8

(51) Int. Cl.
*H01M 10/04* (2006.01)
*H01M 50/543* (2021.01)
(Continued)

(52) U.S. Cl.
CPC ......... *H01M 10/0431* (2013.01); *H01M 4/66* (2013.01); *H01M 6/10* (2013.01); *H01M 50/543* (2021.01)

(58) Field of Classification Search
None
See application file for complete search history.

(56) References Cited

U.S. PATENT DOCUMENTS

| 5,558,682 A * | 9/1996 | Urairi | D06M 10/025 |
| | | | 29/623.5 |
| 6,558,848 B1 * | 5/2003 | Kobayashi | H01M 4/661 |
| | | | 429/241 |

(Continued)

FOREIGN PATENT DOCUMENTS

| CN | 201340887 Y | 11/2009 |
| CN | 102694144 A | 9/2012 |

(Continued)

OTHER PUBLICATIONS

Xu Zhikang et al.; "China's strategic emerging industries New materials High-performance separation membrane materials" Chapter 8 Lithium-Ion Battery Separator; Dec. 31, 2017; pp. 323-327.

*Primary Examiner* — Ula C Ruddock
*Assistant Examiner* — Amanda Rosenbaum
(74) *Attorney, Agent, or Firm* — Muncy, Geissler, Olds & Lowe, P.C.

(57) ABSTRACT

A method for manufacturing a spiral-wound battery is provided. The method includes the following steps: performing surface plasma treatment on a current collector; coating electrode slurry on a surface of the current collector, to form an electrode foil; performing surface plasma treatment on an isolating film, to improve hydrophilia of the isolating film; arranging and electrically connecting a plurality of metal conductive handles to the electrode foil, where the electrode foil is divided into a plurality of sections, and each section of the electrode foil corresponds to a jelly roll; and sequentially winding the isolating film and the electrode foil to form the spiral-wound battery. According to the method for manufacturing a spiral-wound battery provided in the present disclosure, internal impedance of a jelly roll is effectively reduced, and advantages of a high (Continued)

yield and low costs of a manufacturing process of the spiral-wound battery are maintained.

8 Claims, 11 Drawing Sheets

(51) Int. Cl.
*H01M 4/04* (2006.01)
*H01M 4/139* (2010.01)
*H01M 4/66* (2006.01)
*H01M 6/10* (2006.01)

(56) References Cited

U.S. PATENT DOCUMENTS

| | | | |
|---|---|---|---|
| 2010/0124694 A1* | 5/2010 | Hikata | H01M 50/528 |
| | | | 29/730 |
| 2013/0202923 A1* | 8/2013 | Kim | H01M 50/183 |
| | | | 429/185 |
| 2014/0013589 A1 | 1/2014 | Wang et al. | |
| 2016/0336547 A1* | 11/2016 | Dawson | H01M 50/152 |
| 2018/0013151 A1* | 1/2018 | Yoneda | H01M 6/10 |
| 2018/0183059 A1* | 6/2018 | Park | H01M 10/0525 |
| 2019/0237758 A1* | 8/2019 | Dadheech | H01M 10/0525 |

FOREIGN PATENT DOCUMENTS

| | | | |
|---|---|---|---|
| CN | 103236510 A | 8/2013 | |
| CN | 103545485 A | 1/2014 | |
| CN | 105870457 A | 8/2016 | |
| CN | 106654350 A | 5/2017 | |
| KR | 20150082959 A | 7/2015 | |

\* cited by examiner

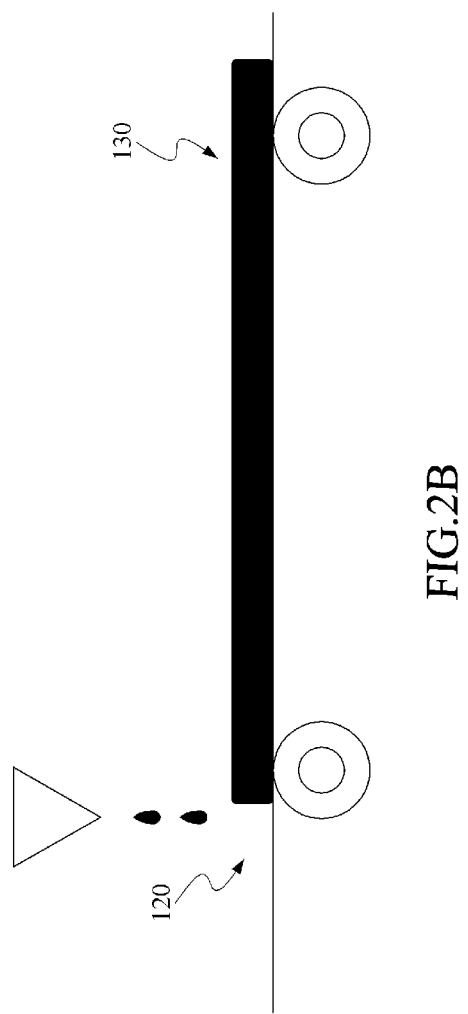

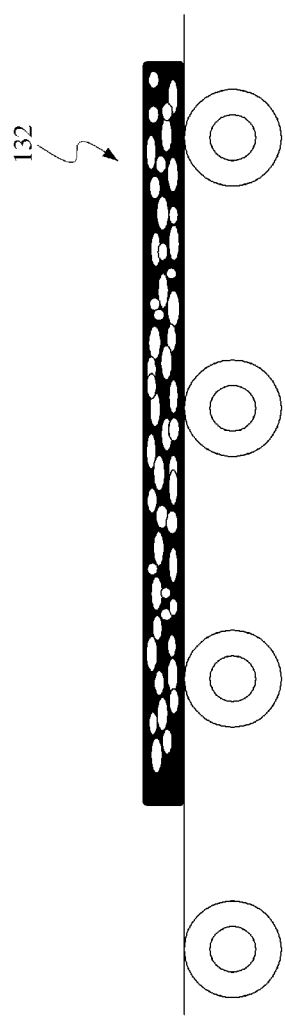

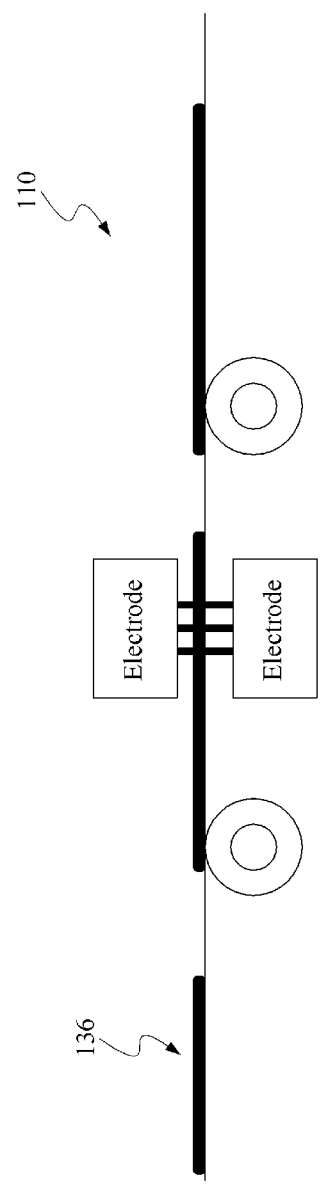

METHOD FOR MANUFACTURING SPIRAL-WOUND BATTERY

CROSS-REFERENCE TO RELATED APPLICATION

This application claims the priority benefit of Chinese Application Serial No. 201810251344.8, filed on Mar. 26, 2018. The entirety of the above-mentioned patent application is hereby incorporated by reference herein and made a part of specification.

BACKGROUND OF THE INVENTION

Field of the Invention

This disclosure relates to a method for manufacturing a laminate polymer battery, and in particular, to a method for manufacturing a spiral-wound battery.

Description of the Related Art

A jelly roll inside a laminate polymer battery mainly consists of positive and negative pole pieces, an isolating film, and an electrolyte.

Arrangement and manufacturing manners of positive and negative pole pieces in a battery include spiral-winding and stacking manufacturing processes. In the spiral-winding manufacturing process, the battery manufacturing process is relatively easy, the battery yield is high, and the price is low. The disadvantages are that when the internal impedance of the battery is high, heat generation is easy to occur, and the efficiency of charging and discharging of the battery is low. If the internal impedance needs to be reduced, the stacking manufacturing process with a relatively complex process, a low yield, and a relatively high price is mostly selected.

BRIEF SUMMARY OF THE INVENTION

In view of this, the present disclosure provides a method for manufacturing a spiral-wound battery. According to the disclosure herein, the internal impedance of a jelly roll is effectively reduced while the advantages of such manufacturing process of the spiral-wound battery are kept.

The present disclosure provides a method for manufacturing a spiral-wound battery. The method includes the following steps: performing a surface plasma treatment on a current collector; coating an electrode slurry on a surface of the current collector, to form an electrode foil; performing the surface plasma treatment on an isolating film, to improve hydrophilia of the isolating film; arranging and electrically connecting a plurality of metal conductive handles to the electrode foil, where the electrode foil is divided into a plurality of sections, and each section of the electrode foil corresponds to a jelly roll; and sequentially winding the isolating film and the electrode foil to form the spiral-wound battery.

As stated above, according to the method for manufacturing a spiral-wound battery provided herein, the surface plasma treatment is performed on a current collector in the manufacturing process of the spiral-wound battery to improve contact impedance between the current collector and a positive (negative) material, and the surface plasma treatment is also performed on an isolating film to improve hydrophilia of the isolating film, and to reduce the ion impedance of the isolating film.

In addition, a setting manner of metal conductive handles is adjusted to shorten an electron transfer distance, to reduce electronic impedance. Therefore, according to the method for manufacturing a spiral-wound battery provided in the present disclosure, internal impedance of a jelly roll is effectively reduced, and advantages of a high yield and low costs of a manufacturing process of the spiral-wound battery are kept.

Specific embodiments used in the present disclosure will be further described by using the following embodiments and accompanying drawings.

BRIEF DESCRIPTION OF THE DRAWINGS

FIG. 2A to FIG. 2F are schematic diagrams of an embodiment of a process of manufacturing an electrode foil in a method for manufacturing a spiral-wound battery of the present disclosure;

DETAILED DESCRIPTION OF THE EMBODIMENTS

Specific implementations of the present disclosure will be described below in a more detailed manner with reference to schematic diagrams. Advantages and features of the present disclosure will be clearer according to the following descriptions and appended claims. It should be noted that the drawings all adopt a very simplified form and all use inaccurate ratios, and are only used to conveniently and clearly help describe the objective of the embodiments of the present disclosure.

Figure 1:
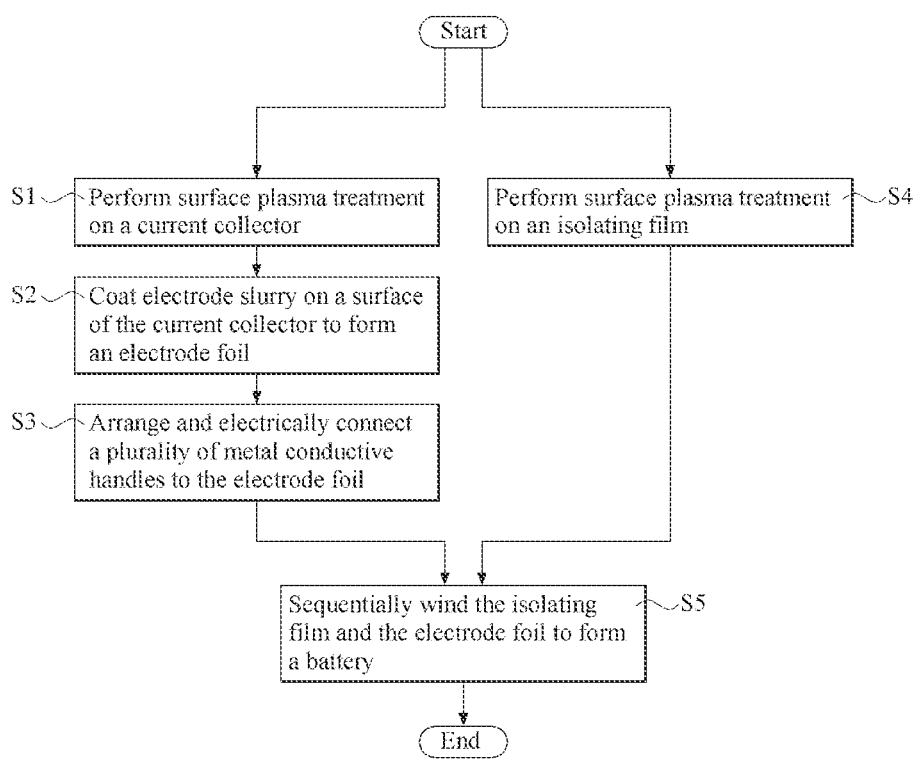
FIG. 1 is a flowchart of an embodiment of a method for manufacturing a spiral-wound battery of the present disclosure.

FIG. 1 is a flowchart of an embodiment of a method for manufacturing a spiral-wound battery of the present disclosure. As shown in the figure, the method includes the following steps.

As shown in step S1, first, a surface plasma treatment is performed on a current collector; then, as shown in step S2, an electrode slurry is coated on a surface of the current collector to form an electrode foil. The manufacturing process of the electrode foil will be described in a more detailed manner in subsequent paragraphs corresponding to FIG. 2A to FIG. 2F.

Then, as shown in step S3, a plurality of metal conductive handles is arranged and electrically connected to the electrode foil, where the electrode foil is divided into a plurality of sections, and each section of the electrode foil corresponds to a jelly roll. The step of disposing the metal conductive handles will be described in a more detailed manner in subsequent paragraphs corresponding to FIG. 4 and FIG. 5.

On the other hand, as shown in step S4, the surface plasma treatment is performed on an isolating film, to improve hydrophilia of the isolating film. Finally, as shown in step S5, the isolating film and the electrode foil are sequentially wound to form the spiral-wound battery. The step of performing the surface plasma treatment on the isolating film and the final step of forming the battery through winding will be described in a more detailed manner in subsequent paragraphs corresponding to FIG. 6.

FIG. 2A to FIG. 2F are schematic diagrams of an embodiment of a process of manufacturing an electrode foil in a method for manufacturing a spiral-wound battery of the present disclosure. This embodiment is applicable to a manufacturing process of a positive electrode foil or a negative electrode foil.

Figure 2A:
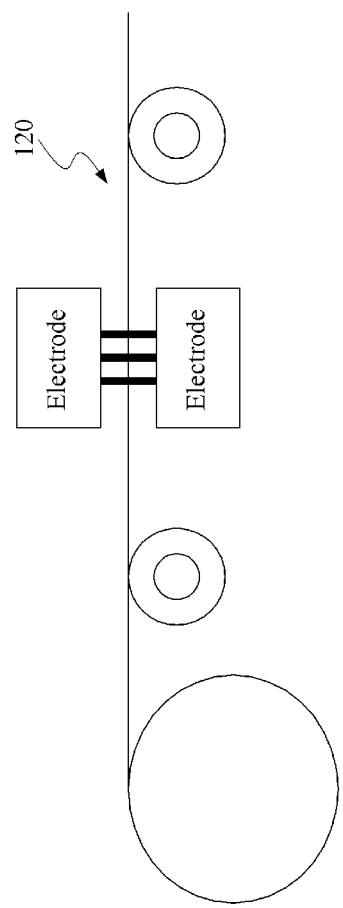

As shown in FIG. 2A, first, the surface plasma treatment is performed on a current collector 120. In an embodiment, the current collector 120 is a copper foil or an aluminum foil. The step of the surface plasma treatment is to clean a surface of the current collector by using atmosphere plasma. Thus to reduce the contact impedance on an interface between the current collector 120 and a subsequently coated electrode material. Consequently, the strength of bonding between the current collector 120 and the electrode material is improved. Accordingly, instead of performing the atmosphere plasma process does not need to be performed in a sealed cavity, and directly performed in production processes. The manufacturing costs and time are thus reduced.

Figure 2D:
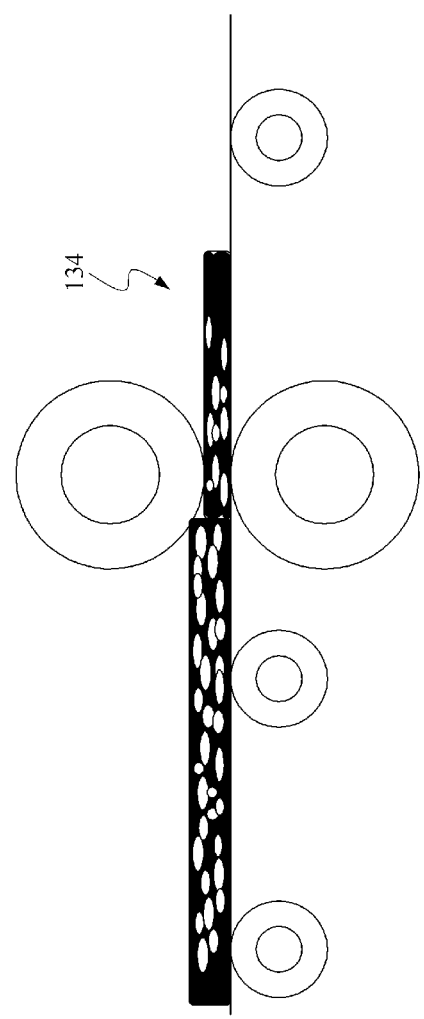
Figure 2E:
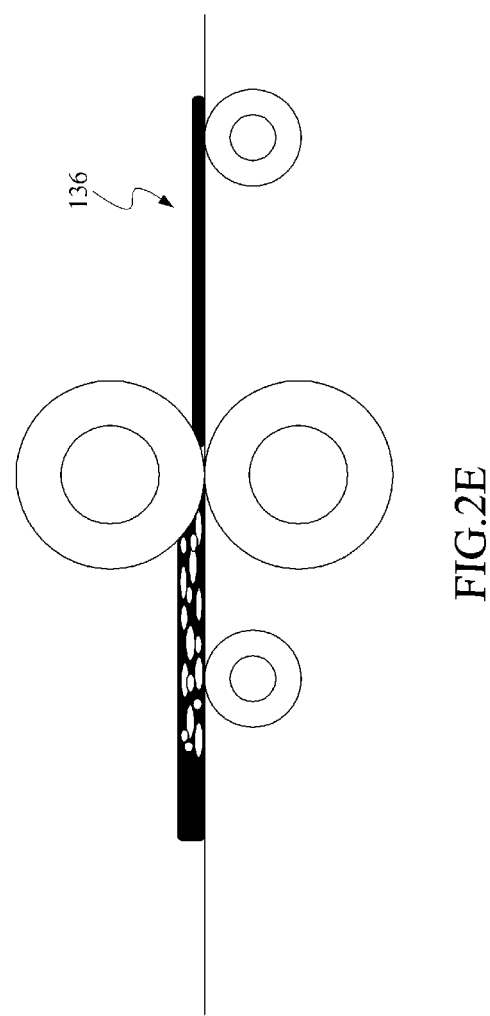

Next, as shown in FIG. 2B, electrode slurry 130 is coated on the surface of the current collector. Constituents of the electrode material are well known in this technical field which is omitted herein. Subsequently, as shown in FIG. 2C, a baking step is performed to remove solution in the electrode slurry 130, to retain the electrode material 132. Next, as shown in FIG. 2D and FIG. 2E, electrode materials 134 and 136 are gradually compacted by using a roller, to form an electrode foil 110. This electrode foil 110 consists of the current collector 120 and the electrode material 136 formed on the current collector 120.

The electrode material of this embodiment undergoes two rolling steps (corresponding to FIG. 2D and FIG. 2E), to form the electrode foil 110. However, the present disclosure is not limited thereto. Based on actual conditions and requirements (for example, the thickness of the electrode foil and the attribute of the electrode material), according to the manufacturing method of the present disclosure, only one rolling step is performed on the electrode material.

Subsequently, as shown in FIG. 2F, after the foregoing rolling step is completed, the surface plasma treatment is performed on the electrode foil 110, to clean the surface thereof. Consequently, the preparation of the electrode foil 110 is completed.

Figure 3:
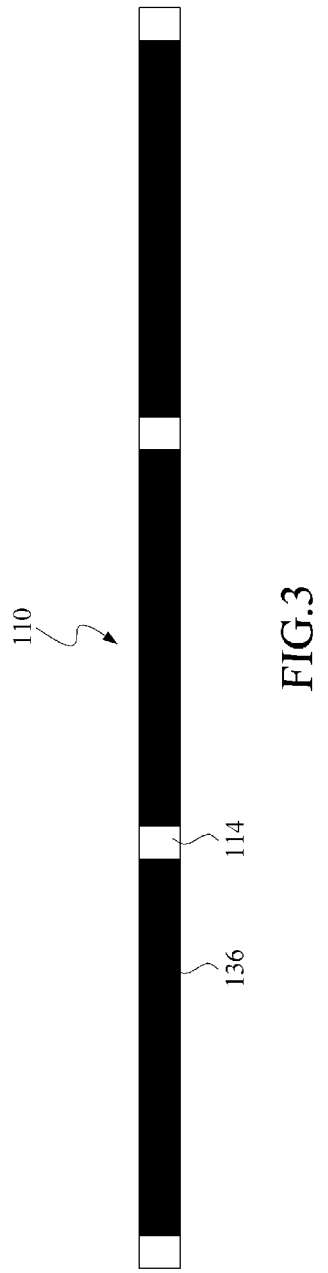
FIG. 3 is a schematic top view of an embodiment of the electrode foil manufactured by using the manufacturing process in FIG. 2A to FIG. 2F.

FIG. 3 is a schematic top view of an embodiment of the electrode foil manufactured by using the manufacturing process in FIG. 2A to FIG. 2F. As shown in the figure, the electrode material 136 of the electrode foil 110 is formed on the current collector 120 in a segmented manner, and the electrode foil 110 is divided into a plurality of sections 112. Each section 112 of the electrode foil corresponds to a jelly roll. To be specific, each section 112 of the electrode foil is cut and wound to each jelly roll.

Further, for the manufacturing process, the step of coating the electrode slurry in FIG. 2B is performed in an intermittent coating manner. To be specific, in the coating process, supply of the electrode slurry 130 is paused at distance intervals or time intervals each time, to form a blank area 114 between sections of the electrode material 136.

Secondly, although FIG. 2A to FIG. 2F show only the manufacturing process in which the electrode material is coated on a single side, the present disclosure is not limited thereto. In an embodiment, the electrode foil 110 is formed through single-sided coating, or is formed through double-sided coating in an embodiment. If double-sided coating is conducted, the surface plasma treatment and the electrode slurry coating steps on a single side are first introduced through the steps in FIG. 2A and FIG. 2B, and then the same steps are introduced on the other side. Furthermore, the double-sided plasma treatment steps and the double-sided coating steps are simultaneously performed with an applicable device.

Figure 4:
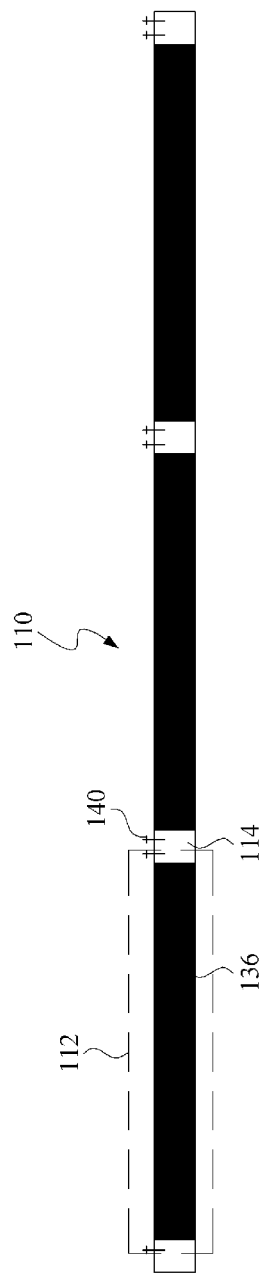
FIG. 4 is a schematic diagram of a first embodiment of a setting manner of metal conductive handles in a method for manufacturing a spiral-wound battery of the present disclosure.

FIG. 4 is a schematic diagram of a first embodiment of a setting manner of metal conductive handles in a method for manufacturing a spiral-wound battery of the present disclosure. As shown in the figure, after the process of manufacturing the electrode foil 110 shown in FIG. 3 is completed, a plurality of metal conductive handles 140 is repeatedly arranged in the blank area 114 of the electrode foil 110 in a default sequence, and the metal conductive handles 140 are electrically connected to the electrode foil 110. In an embodiment, the metal conductive handles 140 is electrically connected to the current collector 120 of the electrode foil 110 by using an ultrasonic soldering or fusion welding process.

In an embodiment, to reduce contact impedance between the metal conductive handle 140 and the electrode foil 110 (particularly the current collector 120), and improve the bonding strength, before the soldering or fusion welding process is performed, the surface plasma treatment is firstly performed on the electrode foil 110 to clean the surface of the current collector 120.

In this embodiment, each section 112 of the electrode foil is provided with two metal conductive handles 140, respectively located in blank areas 114 at a front end and a rear end of each section of the electrode foil 112. However, the present disclosure is not limited thereto. In other embodiments, according to actual requirements, each section of the electrode foil 112 is provided with a larger number of metal conductive handles 140, to shorten a distance by which electrons on the current collector 120 flow to the metal conductive handles 140, to reduce electronic impedance. In addition, the metal conductive handles 140 are not limited to be disposed at the front end and the rear end of each section of the electrode foil 112.

Figure 5:
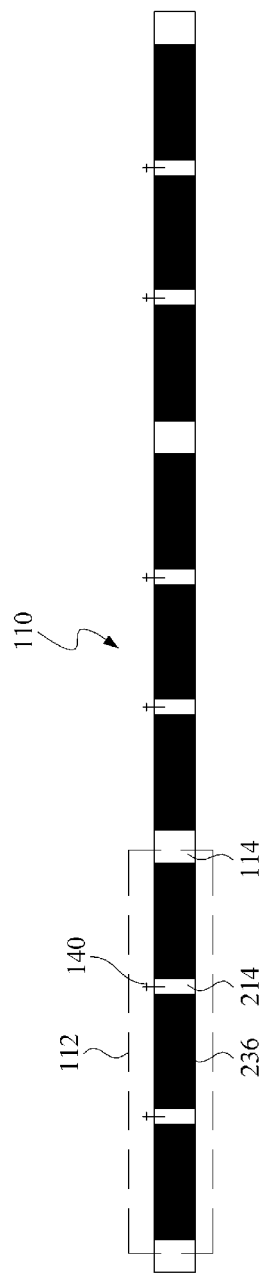
FIG. 5 is a schematic diagram of a second embodiment of a setting manner of metal conductive handles in a method for manufacturing a spiral-wound battery of the present disclosure.

For example, as shown in FIG. 5, in a second embodiment of a setting manner of the metal conductive handle 140 of the present disclosure, there are original blank areas 114 in each section of the electrode foil 112, and two additional blank areas 214 are also formed in an intermediate portion of the electrode material 236 for disposing the metal conductive handles 140, to shorten the distance by which the electrons on the current collector 120 flow to the metal conductive handles 140.

In an embodiment, the two blank areas 214 is formed at ⅓ and ⅔ locations of a length direction of each section of the electrode foil 112, or at ¼ and ¾ locations of the length direction of each section of the electrode foil 112, to shorten the distance by which the electrons on the current collector 120 flow to the metal conductive handles 140.

Figure 6:
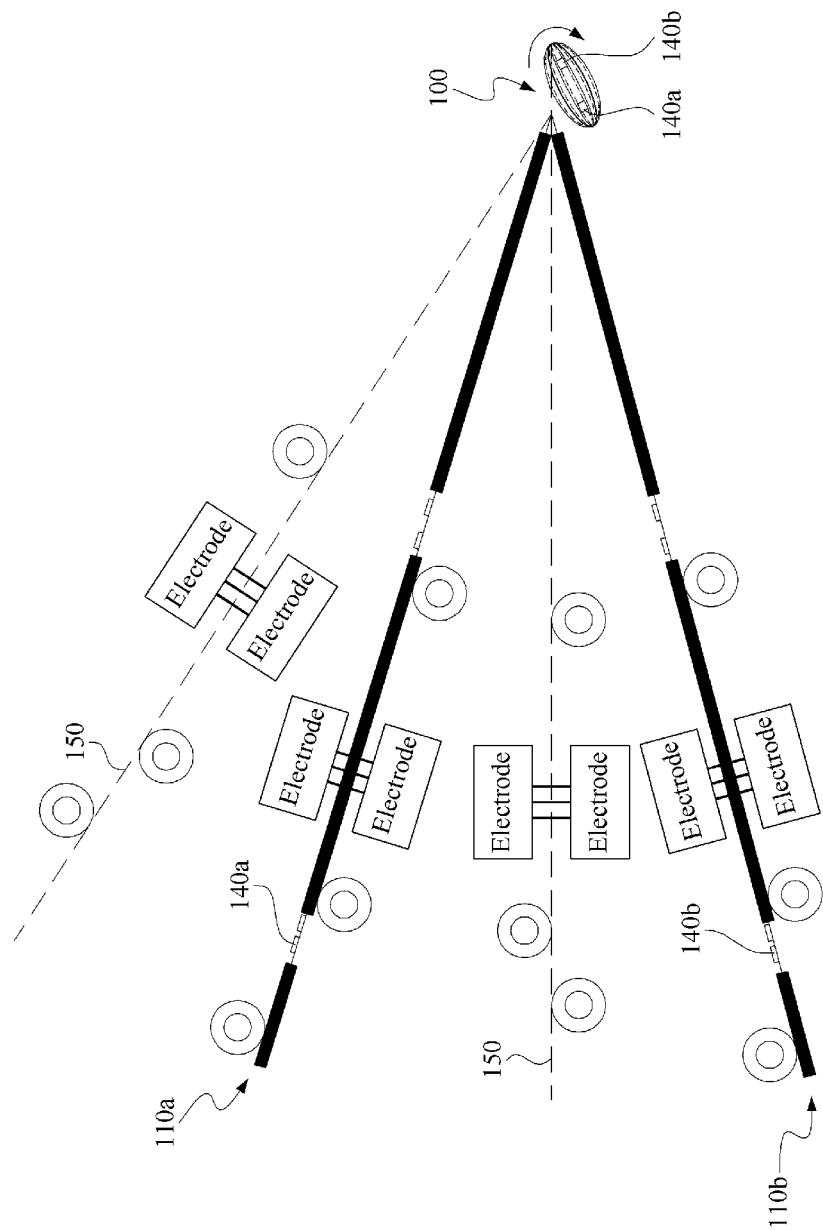
FIG. 6 is a schematic diagram of a manufacturing step of sequentially winding an isolating film and an electrode foil to form a battery in a method for manufacturing a spiral-wound battery of the present disclosure.

FIG. 6 is a schematic diagram of a manufacturing step of sequentially winding an isolating film 150 and electrode foils 110a and 110b to form a battery 100 in a method for manufacturing a spiral-wound battery of the present disclosure. As shown on the left side in the figure, before a winding procedure is performed, a surface plasma treatment is performed on the isolating film 150, to improve hydrophilia of the isolating film 150, and reduce ion impedance of the isolating film 150. In addition, in this manufacturing process, surface cleaning is also performed on the electrode foils 110a and 110b by using atmosphere plasma, to reduce contact impedance.

In this embodiment as described above, the surface plasma treatment is performed on the isolating film 150 by using an atmosphere plasma process, to increase surface roughness of the isolating film 150, thereby improving hydrophilia of the isolating film. In this embodiment, the isolating film 150 is a polymer film. However, according to actual requirements, an adhesive layer or a ceramic material layer is additionally covered on the surface of the isolating film.

As shown on the right side in the figure, the isolating film 150 and the electrode foils 110a and 110b provided with metal conductive handles 140a and 140b are sequentially stacked and wound to form the spiral-wound battery 100. Specifically, in this manufacturing step, two isolating films 150 and two electrode foils 110a and 110b (a positive film and a negative film) are alternately stacked and wound, and cutting and fixing steps are performed after they are wound to a predetermined size, to form the spiral-wound battery 100. In addition, a plurality of metal conductive handles 140a and 140b disposed on the electrode foils 110a and 110b are then connected, to form a positive pole and a negative pole of the battery 100. The battery 100 is applied to a lithium ion battery, or another battery suitable to use a spiral-winding manufacturing process in an embodiment.

As stated above, according to the method for manufacturing a spiral-wound battery provided in the present disclosure, the surface plasma treatment is performed on a current collector in a manufacturing process of the spiral-wound battery, to improve contact impedance between the current collector and a positive (or negative) material, and the surface plasma treatment is also performed on an isolating film, to improve hydrophilia of the isolating film, and reduce ion impedance of the isolating film. In addition, a setting manner of metal conductive handles is adjusted to shorten an electron transfer distance, to reduce electronic impedance. Therefore, according to the method for manufacturing a spiral-wound battery provided in the present disclosure, internal impedance of a jelly roll is effectively reduced, and advantages of a high yield and low costs of a manufacturing process of the spiral-wound battery are maintained.

Although the present disclosure is disclosed above by using the embodiments, the embodiments are not intended to limit the present disclosure. Any person of ordinary skill in the art can make some variations and modifications without departing from the spirit and scope of the present disclosure. Therefore, the protection scope of the present disclosure is subject to the appended claims.

What is claimed is:

1. A method for manufacturing a spiral-wound battery, comprising: performing a surface plasma treatment on a current collector;
   coating an electrode slurry on a surface of the current collector, to form an electrode foil;
   performing the surface plasma treatment on an isolating film;
   arranging and electrically connecting a plurality of metal conductive handles to the electrode foil, wherein the electrode foil is cut into a plurality of sections, and each section of the electrode foil corresponds to a jelly roll; and
   sequentially winding the isolating film and the electrode foil to form the spiral-wound battery,
   wherein each section of the electrode foil has four blank areas, one of the blank areas is disposed at a front end, one of the blank areas is disposed at a rear end, and other two of the blank areas are disposed at an intermediate portion for disposing the metal conductive handles,
   wherein both of the other two of the blank areas have the metal conductive handles disposed therein,
   wherein the step of performing the surface plasma treatment on the isolating film is by using an atmosphere plasma process to increase surface roughness of the isolating film.

2. The method for manufacturing a spiral-wound battery according to claim 1, wherein the step of performing the surface plasma treatment on the current collector is to clean the surface of the current collector by using an atmosphere plasma process.

3. The method for manufacturing a spiral-wound battery according to claim 1, wherein the step of arranging and electrically connecting the metal conductive handles to the electrode foil is to arrange the plurality of metal conductive handles on the plurality of sections of the electrode foil in a default sequence, and to dispose at least two of the metal conductive handles on each section of the electrode foil.

4. The method for manufacturing a spiral-wound battery according to claim 1, wherein the electrode foil is a positive electrode foil or a negative electrode foil.

5. The method for manufacturing a spiral-wound battery according to claim 1, wherein after the step of coating the electrode slurry on the surface of the current collector, the method further comprises a step of baking and compacting the electrode slurry to form the electrode foil.

6. The method for manufacturing a spiral-wound battery according to claim 1, wherein the spiral-wound battery is a lithium ion battery.

7. The method for manufacturing a spiral-wound battery according to claim 1, wherein the current collector is a copper foil or an aluminum foil.

8. The method for manufacturing a spiral-wound battery according to claim 1, wherein the isolating film is a polymer film.

* * * * *